United States Patent
Wygnanski

(10) Patent No.: US 6,848,667 B1
(45) Date of Patent: Feb. 1, 2005

(54) ELECTROMAGNETICALLY OPERATED VALVE

(75) Inventor: Wladyslaw Wygnanski, Cambridge (GB)

(73) Assignee: Comcon Limited, Cambridge (GB)

( * ) Notice: Subject to any disclaimer, the term of this patent is extended or adjusted under 35 U.S.C. 154(b) by 0 days.

(21) Appl. No.: 10/476,049

(22) PCT Filed: Apr. 23, 2002

(86) PCT No.: PCT/GB02/01866

§ 371 (c)(1),
(2), (4) Date: Oct. 23, 2003

(87) PCT Pub. No.: WO02/086364

PCT Pub. Date: Oct. 31, 2002

(30) Foreign Application Priority Data

Apr. 24, 2001 (GB) .............................................. 0109975

(51) Int. Cl.[7] .............................................. F16K 31/08
(52) U.S. Cl. ................. 251/65; 251/129.2; 251/129.21; 251/337; 137/625.44; 335/78
(58) Field of Search .............................. 257/65, 129.21, 257/129.2, 337; 137/625.44; 335/78

(56) References Cited

U.S. PATENT DOCUMENTS

| | | | | |
|---|---|---|---|---|
| 2,366,412 A | * | 1/1945 | Lambert | 251/129.1 |
| 3,443,585 A | * | 5/1969 | Reinicke | 251/129.09 |
| 3,768,051 A | * | 10/1973 | Kurpanek | 335/153 |
| 3,987,383 A | | 10/1976 | Antonitsch | |
| 4,403,765 A | * | 9/1983 | Fisher | 251/65 |
| 4,559,971 A | * | 12/1985 | Bradshaw | 251/65 |
| 4,635,681 A | * | 1/1987 | Boldish | 251/65 |
| 4,819,693 A | * | 4/1989 | Rodder | 137/625.4 |
| 5,144,982 A | * | 9/1992 | Willbanks | 251/65 |
| 5,711,347 A | | 1/1998 | Sturman | |

FOREIGN PATENT DOCUMENTS

JP 03819 2/1982
WO WO 00/207806 A1 4/2000

* cited by examiner

*Primary Examiner*—John Bastianelli
(74) *Attorney, Agent, or Firm*—Barnes & Thornburg

(57) ABSTRACT

A valve for controlling fluid flow having a chamber of non magnetizable material having an inlet opening and at least one outlet opening, a magnetizable armature having a valve closure member, an electromagnetic drive for moving the closure member from one end to the other of a path defined by the chamber. A seating is provided at each end of the path within the chamber, each seating being complementary to the external surface of the closure member, so that the closure member is a snug fit in each seating. A permanent magnet and pole pieces create two opposite, spaced apart powerful magnetic fields in each of which the flux extends across the chamber perpendicular to the direction of movement of the closure member, and a solenoid surrounds the chamber, which when energized creates a second magnetic field, in which the flux is parallel to that of the permanent fields.

18 Claims, 1 Drawing Sheet

SECTION ON Y-Y

SECTION ON X-X

ELECTROMAGNETICALLY OPERATED VALVE

FIELD OF INVENTION

This invention concerns electromagnetically operated valves for controlling or directing fluid flow, typically gas flow, although the invention can be applied to the control of liquids.

BACKGROUND TO THE INVENTION

It has been proposed to move a valve closure member by the linear movement of a magnetic armature by alternating the flux gradient in magnetic field acting on the armature. An arrangement is described in British Patent Application No. 9923744.8

It is an object of the present invention to provide an improved design of valve chamber so that the fluid pressure acts to assist in keeping the valve closure member against a seating to close an exit from the chamber.

SUMMARY OF THE INVENTION

According to the present invention there is provided a valve for controlling fluid flow comprising:—
(1) a chamber of non magnetisable material having an inlet opening and at least one outlet opening.
(2) a magnetisable armature comprising a valve closure member,
(3) an electromagnetic drive for moving the closure member from one end to the other of a path defined by the chamber,
(4) first passage means communicating with at least the inlet opening for supplying fluid under positive pressure to the chamber and second passage means communicating with the at least one outlet opening,
(5) a seating at each end of the path within the chamber, each seating being complementary to the external surface of the closure member, so that the closure member is a snug fit in each seating, said at least one outlet opening being located in or adjacent one of the seatings, so that positioning the closure member in that seating closes off the outlet and prevents fluid from leaving the chamber via the second passage means,
(6) permanent magnet means and pole pieces for creating two opposite, spaced apart powerful magnetic fields in each of which the flux extends across the chamber perpendicular to the direction of movement of the closure member,
(7) solenoid means surrounding the chamber which when energised creates a second magnetic field, in which the flux is parallel to that of the permanent fields, and
(8) circuit means adapted to cause current to flow in one direction or the other in the solenoid, whereby the second field will reinforce the flux in one of the permanent fields and reduce it in the other, thereby to cause the armature to move from the weaker field to the stronger and thereby move from one seating to the other so as to change the state of the valve.

The valve may be arranged to control the flow of fluid from the inlet to the one outlet passage and movement of the closure member from the seating containing the outlet opening to the other seating allows fluid to flow from the chamber along the second passage means, whilst movement of the closure from the other said seating, to the first seating, blocks the outlet opening so that no fluid can leave the chamber.

The valve may include a second outlet opening communicating with a third passage means, the second outlet opening being located in or adjacent the said other seating so that movement of the closure between the seatings causes fluid to leave the chamber either via the second passage means or the third passage means.

Spring means is preferably provided which in the absence of magnetic forces, will centre the closure member in the chamber midway between the seatings.

The spring means may for example act between the closure member and opposed ends of the path in the chamber.

In such an arrangement movement of the closure into one of the seatings under the influence of a change in the overall magnetic field caused by a current flowing in the solenoid, causes one of the springs to be compressed more than the other, so that when a reverse current is supplied to the solenoid, the potential energy stored in the more compressed spring acts to move the closure member towards the other end of its travel within the chamber.

Alternatively and preferably the closure member is acted on by at least one leaf spring which can flex from a mid-position one way or the other to accommodate the closure member's travel, and provide a restoring force acting towards the mid-position when flexed.

Preferably the inner ends of the pole pieces are shaped so as also to be complementary to the surface shape of the closure member, but are adapted to ensure that a small air gap exists between the closure member and the relevant pole pieces when the closure member has moved into each seating.

Alternatively a layer of non-magnetic material is provided on the surface of the closure or pole-pieces, or both, so that the closure cannot come into touching contact with the pole pieces.

Alternatively the gap or thickness of the layer of non-magnetic material is selected so that the flux concentration in the air gap or non-magnetic layer is sufficient to retain the closure member at that end of its travel even after current ceases to flow in the solenoid, but is such that the new magnetic field produced by the solenoid when the latter is energised by an oppositely polarised current, is sufficient to overcome the magnetic force acting on the closure, to cause it to move to the opposite end of its travel.

A flow restrictor may be located in the inlet passage to the chamber.

The chamber may be arranged so that the path of movement of the closure is generally horizontal or generally vertical.

The chamber conveniently may be orientated so that the closure is at the lower end of its travel when it closes off the opening leading to an outlet passage, so that gravity assists in the closure of the outlet opening.

The armature closure member may be solid, or may be hollow to reduce its mass.

The magnetic pole-pieces may be external of the chamber, and the chamber wall is of reduced thickness in the regions of the pole pieces.

The pole-pieces may extend into and partially through the chamber wall, and the reduced thickness of the chamber wall provides a tin layer of non-magnetic material to prevent the armature closure member from coming into contact with the magnetic material of the pole pieces when it is at one end or the other of the path.

BRIEF DESCRIPTION OF THE DRAWINGS

The invention will now be described by way of example with reference to the accompanying drawings, in which.

DETAILED DESCRIPTION OF THE INVENTION

Figure 1:
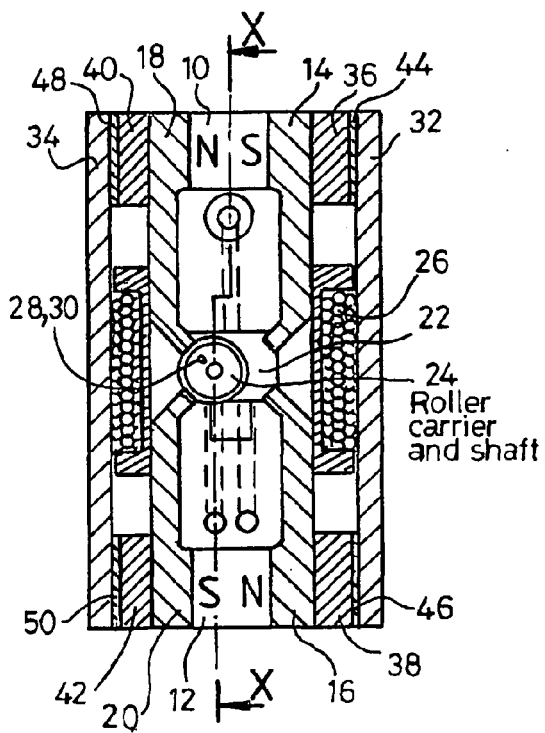
FIG. 1 is a diagrammatic side elevation in cross-section of a valve embodying the invention.

In the drawings, items 10 and 12 are powerful permanent magnets and pole pieces 14, 16, 18 and 20 concentrate the magnetic field into two regions at opposite ends of a chamber 22 within which a part spherical valve closure member 24 is held captive, but is free to move within the chamber from one end to the other under the influence of variations in the magnetic field.

These variations are brought about by passing an electric current through a coil 26. When the current flows in one direction the flux between 14 and 16 is reinforced and that between 18 and 20 is depleted. When the current flows in the opposite direction the effect on the two fluxes is reversed.

The valve closure 24 is formed from magnetisable material and may be solid or hollow, and will tend to be attracted to the region of maximum flux density, and can be thought of as an armature.

If the current flow produces the higher flux density between poles 14 and 16, the armature closure member will move so as to occupy the gap between 14 and 16. By forming the inner surfaces of the pole pieces with complementary part spherical surfaces, the air gap between the pole faces 14, 16 and the closure 24 can be very small, thereby maintaining a very high flux density between 14, 16 even when the current flow ceases. Accordingly the closure 24 will remain between 14, 16.

If current in the opposite direction flows in the winding 26, the reduction in flux between 14, 16 is arranged to be sufficient to "free" the closure 24 and allow it to move so as to occupy the position at the opposite end of its travel between poles 18, 20. By forming these with similar part spherical inwardly facing faces, and ensuring that the remaining gaps between 18, 20 and the closure 24 are very small (as before in the case of 18, 20), when the current ceases to flow, the closure will now remain between poles 18, 20 until such time as current in the appropriate sense is caused to flow in the winding 26 to produce an appropriate magnetic flux gradient and cause the armature closure 24 once again to move to the position between 14, 16.

The movement of the closure is made more reliable by centering the closure by means of leaf springs 28, 30, so that when the latter is at one end the springs 28 and 30 are flexed in one direction and when the closure is at the other end the springs are flexed in the opposite sense.

Figure 4:
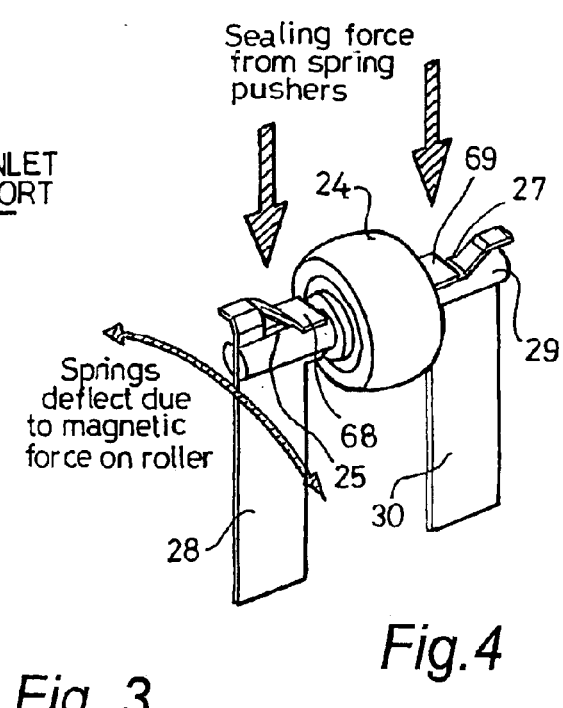
FIG. 4 is a perspective view, to an enlarged scale, of the closure member and leaf springs and shaft on which the closure can rotate.

As shown in FIG. 4, the springs extend through slots 25, 27 at opposite ends of a cylindrical shaft 29 on which the armature closure 24 is rotatable, and the springs bend one way or the other to allow 24 to move from one end to the other of the chamber 22.

The magnetic field is concentrated by the use of magnetic flux return paths 32, 34 separated at their ends from magnetic material blocks 36, 38, 40 and 42 by non-magnetic material spacers 44, 46, 48 and 50. The blocks 36–42 serve as pole extensions to the pole pieces 14, 16, 18 and 20 but the relatively large effective air gaps between for example 32 and 36 at one end and 32 and 38 at the other end, tends to ensure that magnetic flux which might otherwise leak from the outer ends of the pole pieces is retained in a closed magnetic circuit, thereby increasing the flux concentration in the gaps between 14 and 16 and between 18 and 20.

The chamber is formed from a non-magnetic material such as plastics or aluminium.

In the wall of the chamber are two openings, 52, 54 which allow the interior of the chamber to communicate with the passages, 56, 58, both of which can serve as fluid outlets from the chamber.

Opposite openings 52, 54 is another opening 60 also in the chamber wall which allows the interior of the chamber to be supplied with fluid from a pressurised fluid source (not shown) via an inlet passage 62. A flow restrictor 64 may be located in the passage 62. The region around each of openings 52 and 54 is complementary to the spherical shape of closure 24, so that if the closure is located over either opening 52 or 54, any positive pressure within the chamber will tend to press the closure against the complementary surface and thereby seal the opening and passage beyond (i.e. 58 in the case of opening 54) from the interior of the chamber. In this case, passage 52 freely communicates with the interior and fluid entering the chamber from 62 can pass out through opening 52 into passage 56.

If passage 56 is blocked off, then fluid is in fact prevented from leaving the chamber.

The valve can thus be converted from a diverter valve (diverting fluid from 58 to 56 or vice versa depending on which of openings 52 and 54 are covered by the closure) to a single on/off valve by blocking off 56 (or 58).

A flow restrictor (not shown) may be located in either or both of 56 and 58 if desired to increase the pressure in the chamber.

Figure 2:
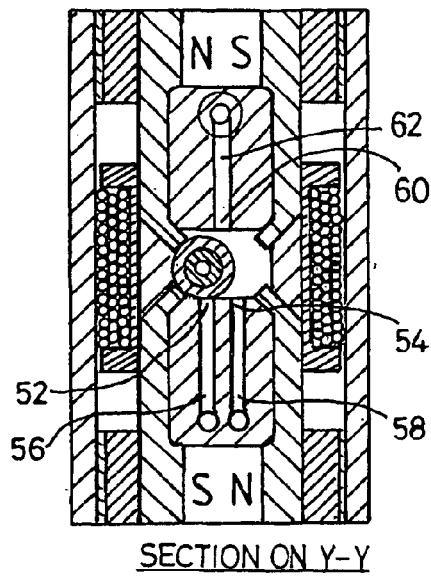
FIG. 2 is a diagrammatic top view, also in cross-section, of the valve of FIG. 1.
Figure 3:
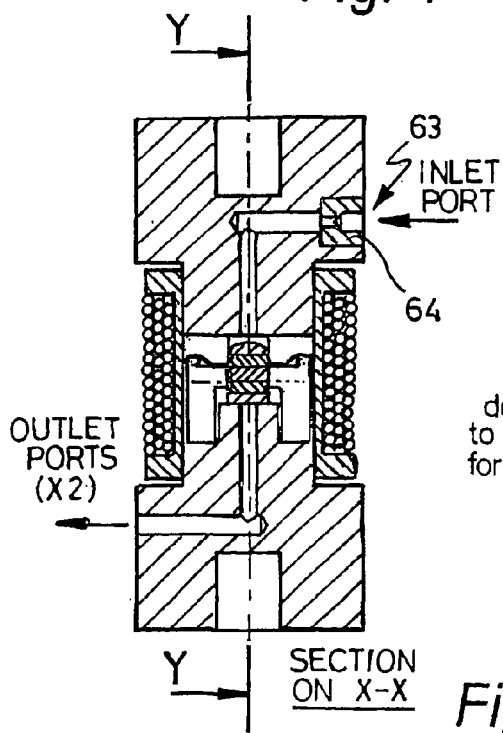
FIG. 3 is a diagrammatic end elevation also in cross-section of the valve of FIG. 1.

One of the outlet openings 52 can be seen (in hidden detail) in FIG. 2 together with the outlet passage 56, and opposite can be seen the inlet opening 60 and inlet passage 62. A restrictor 64 is shown in FIG. 3 in the inlet port 63 leading to passage 62.

Being a cross-section, lower pole pieces 18 and 20 and magnets 10 and 12 are also visible in FIG. 2.

Although not shown, if the path of movement of the closure 24 is generally vertical, gravity can be employed to assist in retaining the closure at the lower end, shutting off the outlet. Any failure of the magnetic circuit would tend to allow the closure to drop under gravity, making the valve fail safe (under gravity and if provided the effect of any spring acting in a downward sense.

Additional sealing force can be provided by additional leaf springs such as 68, 69 (see FIG. 4) acting on the shaft 29.

What is claimed is:

1. A valve for controlling fluid flow comprising:
   (1) a chamber of non magnetisable material having an inlet opening and at least one outlet opening,
   (2) a magnetisable armature comprising a valve closure member,
   (3) an electromagnetic drive for moving the closure member from one end to the other of a path defined by the chamber,
   (4) first passage means communicating with at least the inlet opening for supplying fluid under positive pressure to the chamber and second passage means communicating with the at least one outlet opening, (5) a seating at each end of the path within the chamber, each seating being complementary to the external surface of the closure member, so that the closure member is a snug fit in each seating, said at least one outlet opening being located in or adjacent one of the seatings, so that positioning the closure member in that seating closes off the outlet and prevents fluid from leaving the chamber via the second passage means, (6) permanent magnet means and pole pieces for creating two opposite, spaced apart powerful magnetic fields in each of which the flux extends across the chamber perpendicular to the direction of movement of the closure member, (7) solenoid means surrounding the chamber which when energised creates a second magnetic field, in which the flux is parallel to that of the permanent fields, and (8) circuit means adapted to cause current to flow in one direction or the other in the solenoid, whereby the second field will reinforce the flux in one of the permanent fields and reduce it in the other, thereby to cause the armature to move from the weaker field to the stronger and thereby move from one seating to the other so as to change the state of the valve.

2. A valve as claimed in claim 1 when arranged to control the flow of fluid from the inlet to the one outlet passage and movement of the closure member from the seating containing the outlet opening to the other seating allows fluid to flow from the chamber along the second passage means, whilst movement of the closure from the other said seating, to the first seating, blocks the outlet opening so that no fluid can leave the chamber.

3. A valve as claimed in claim 1 further comprising a second outlet opening communicating with a third passage means, the second outlet opening being located in or adjacent the said other seating so that movement of the closure between the seatings causes fluid to leave the chamber either via the second passage means or the third passage means.

4. A valve as claimed in any of claims 1 to 3 further comprising spring means which in the absence of magnetic forces, will centre the closure member in the chamber midway between the seatings.

5. A valve as claimed in claim 4 wherein the spring means acts between the closure member and opposed ends of the path in the chamber.

6. A valve as claimed in claim 4 or 5 wherein movement of the closure into one of the seatings under the influence of a change in the overall magnetic field caused by a current flowing in the solenoid, causes one of the springs to be compressed more than the other, so that when a reverse current is supplied to the solenoid, the potential energy stored in the more compressed spring acts to move the closure member towards the other end of its travel within the chamber.

7. A valve as claimed in any of claims 1 to 4 wherein the closure member is acted on by at least one leaf spring which can flex from a mid-position one way or the other to accommodate the closure member's travel, and provide a restoring force acting towards the mid-position when flexed.

8. A valve as claimed in any of claims 1 to 7 wherein the inner ends of the pole pieces are shaped so as also to be complementary to the surface shape of the closure member, but are adapted to ensure that a small air gap exists between the closure member and the relevant pole pieces when the closure member has moved into each seating.

9. A valve as claimed in any of claims 1 to 7 wherein a layer of non-magnetic material is provided on the surface of the closure or pole-pieces, or both, so that the closure cannot come into touching contact with the pole pieces.

10. A valve as claimed in either of claims 8 or 9 wherein the gap or thickness of the layer of non-magnetic material is selected so that the flux concentration in the air gap or non-magnetic layer is sufficient to retain the closure member at that end of its travel even after current ceases to flow in the solenoid, but is such that the new magnetic field produced by the solenoid when the latter is energised by an oppositely polarised current, is sufficient to overcome the magnetic force acting on the closure, to cause it to move to the opposite end of its travel.

11. A valve as claimed in any of claims 1 to 10 wherein a flow restrictor is located in the inlet passage to the chamber.

12. A valve as claimed in any of claims 1 to 11 wherein the chamber is arranged so that the path of movement of the closure is generally horizontal.

13. A valve as claimed in any of claims 1 to 11 wherein the chamber is arranged so that the path of movement of the closure is generally vertical.

14. A valve as claimed in claim 13 in which the chamber is orientated so that the closure is at the lower end of its travel when it closes off the opening leading to an outlet passage, so that gravity assists in the closure of the outlet opening.

15. A valve as claimed in any of claims 1 to 14 wherein the armature closure member is solid.

16. A valve as claimed in any of claims 1 to 14 wherein the armature closure member is hollow to reduce its mass.

17. A valve as claimed in any of claims 1 to 16 wherein the magnetic pole-pieces are external of the chamber, and the chamber wall is of reduced thickness in the regions of the pole pieces.

18. A valve as claimed in claim 17 wherein the pole-pieces extend into and partially through the chamber wall, and the reduced thickness of the chamber wall provides a thin layer of non-magnetic material to prevent the armature closure member from coming into contact with the magnetic material of the pole pieces when it is at one end or the other of the path.

* * * * *